(12) United States Patent
Wicks

(10) Patent No.: US 11,475,747 B2
(45) Date of Patent: Oct. 18, 2022

(54) ELECTRONIC PRODUCT CODE (EPC) ENCODING FOR RETAILER-SPECIFIC RADIO-FREQUENCY IDENTIFICATION (RFID) TAGS

(71) Applicant: Sensormatic Electronics, LLC, Boca Raton, FL (US)

(72) Inventor: Brian M. Wicks, Schertz, TX (US)

(73) Assignee: Sensormatic Electronics, LLC, Boca Raton, FL (US)

(*) Notice: Subject to any disclaimer, the term of this patent is extended or adjusted under 35 U.S.C. 154(b) by 41 days.

(21) Appl. No.: 17/109,516

(22) Filed: Dec. 2, 2020

(65) Prior Publication Data
US 2021/0201642 A1    Jul. 1, 2021

Related U.S. Application Data

(60) Provisional application No. 62/953,759, filed on Dec. 26, 2019.

(51) Int. Cl.
*G08B 13/24* (2006.01)
*G06Q 20/20* (2012.01)

(52) U.S. Cl.
CPC ....... *G08B 13/2417* (2013.01); *G06Q 20/202* (2013.01)

(58) Field of Classification Search
CPC ............ G08B 13/2417; G06Q 20/202; G06Q 20/208; G06K 19/0723; G06K 7/10297; G07G 1/0054; G07G 1/009

USPC ................................................. 340/10.1–10.6
See application file for complete search history.

(56) References Cited

U.S. PATENT DOCUMENTS

| | | | |
|---|---|---|---|
| 2006/0113374 A1* | 6/2006 | Taylor | G06Q 10/087 235/375 |
| 2007/0109100 A1* | 5/2007 | Jett | H04L 12/189 340/9.1 |
| 2009/0129595 A1* | 5/2009 | Stam | H04L 63/08 380/277 |
| 2018/0047032 A1* | 2/2018 | Wu | G06Q 30/0185 |

FOREIGN PATENT DOCUMENTS

| | | | | |
|---|---|---|---|---|
| WO | WO-2005066787 A1 * | 7/2005 | ......... | G06F 12/0246 |
| WO | WO-2007027151 A1 * | 3/2007 | ............ | G06F 21/31 |

* cited by examiner

*Primary Examiner* — Brian Wilson
(74) *Attorney, Agent, or Firm* — ArentFox Schiff LLP

(57) ABSTRACT

A system determines an electronic product code (EPC) and a checksum read from a radio-frequency identification (RFID) tag. The system calculates a new checksum based on the EPC and a retailer-specific number associated with a retailer that owns one or more RFID tags. The system compares the new checksum with the checksum read from the RFID tag, and determines whether the RFID tag is owned by the retailer based on whether the new checksum matches the checksum read from the RFID tag.

24 Claims, 12 Drawing Sheets

Example RFID 96-bit

| Header | CA | 14 Digit Product Code | | | | | | Serial Number | | | |
|---|---|---|---|---|---|---|---|---|---|---|---|
| 00111011110 | 0100 | 00000000000000000000101110100101010100111 | | | | | | 000000000000000000101011100011 | | | |
| 3B | E4 | 00 | 00 | 01 | 74 | EA | A7 | 00 | 00 | 2A | E3 |

Example Enhanced RFID 96-bit format

| Header | CA | Checksum | | | 9 Digit Product Code | | | | Serial Number | | |
|---|---|---|---|---|---|---|---|---|---|---|---|
| Bits 0...11 | Bits 12..15 | Bits 16..28 | | | Bits 29...63 | | | | Bits 64..95 | | |
| Byte 0 | Byte 1 | Byte 2 | Byte 3 | Byte 4 | Byte 5 | Byte 6 | Byte 7 | Byte 8 | Byte 9 | Byte 10 | Byte 11 |

*FIG. 4*

Example Enhanced RFID 96-bit (First Retailer; retailer-specific number = 3)

| Header | CA | Checksum | 9 Digit Product Code | | | | Serial Number | | | |
|---|---|---|---|---|---|---|---|---|---|---|
| 00111011 10 | 0100 | 000001010100 | 00000000000001011101001110101010100111 | | | | 0000000000000000000010101100011 | | | |
| 3B | E4 | 05 | 40 | 01 | 74 | EA | A7 | 00 | 00 | 2A | E3 |

*FIG. 5*

Example Enhanced RFID 96-bit (Second Retailer; retailer-specific number = 6)

| Header | CA | Checksum | | 9 Digit Product Code | | | | Serial Number | | |
|---|---|---|---|---|---|---|---|---|---|---|
| 00111011 10 | 0100 | 000010101000 | | 000000000010111010011101010100111 | | | | 0000000000000000000010101110011 | | |
| 3B | | 0A | 80 | 01 | 74 | EA | A7 | 00 | 00 | 2A | E3 |

ELECTRONIC PRODUCT CODE (EPC) ENCODING FOR RETAILER-SPECIFIC RADIO-FREQUENCY IDENTIFICATION (RFID) TAGS

CROSS-REFERENCE TO RELATED APPLICATION(S)

This application claims the benefit of U.S. Provisional Application Ser. No. 62/953,759, entitled "ELECTRONIC PRODUCT CODE (EPC) ENCODING FOR RETAILER-SPECIFIC RADIO-FREQUENCY IDENTIFICATION (RFID) TAGS" and filed on Dec. 26, 2019, which is expressly incorporated by reference herein in its entirety.

FIELD

The present disclosure relates generally to systems and methods including or utilizing radio-frequency identification (RFID) tags.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method includes determining an electronic product code (EPC) and a checksum read from a radio-frequency identification (RFID) tag. The method further includes calculating a new checksum based on the EPC and a retailer-specific number associated with a retailer that owns one or more RFID tags. The method further includes comparing the new checksum with the checksum read from the RFID tag. The method further includes determining whether the RFID tag is owned by the retailer based on whether the new checksum matches the checksum read from the RFID tag.

In another aspect, an RFID tag includes an antenna and an RFID chip coupled with the antenna. The RFID chip includes a memory space. The memory space is loaded with an EPC and a checksum. The checksum is calculated based on the EPC and a retailer-specific number associated with a retailer that owns the RFID tag.

In a further aspect, an RFID reader includes an antenna configured to radiate RFID interrogation signals and receive RFID response signals from an RFID tag in response to the RFID interrogation signals. The RFID reader further includes a processor coupled with the antenna. The processor is configured to determine, based on the RFID response signals received from the RFID tag, an EPC and a checksum that have been loaded onto the RFID tag. The processor is further configured to calculate a new checksum based on the EPC and a retailer-specific number associated with a retailer that owns one or more RFID tags. The processor is further configured to compare the new checksum with the checksum read from the RFID tag. The processor is further configured to determine whether the RFID tag is owned by the retailer based on whether the new checksum matches the checksum read from the RFID tag.

In yet another aspect, a cloud system includes at least one memory and at least one processor coupled with the at least one memory. The at least one processor is configured to receive an EPC and a checksum read from an RFID tag. The at least one processor is further configured to calculate a new checksum based on the EPC and a retailer-specific number associated with a retailer that owns one or more RFID tags. The at least one processor is further configured to compare the new checksum with the checksum read from the RFID tag. The at least one processor is further configured to determine whether the RFID tag is owned by the retailer based on whether the new checksum matches the checksum read from the RFID tag.

In a further aspect, a mobile device includes at least one memory and at least one processor coupled with the at least one memory. The at least one processor is configured to receive an EPC and a checksum read from an RFID tag. The at least one processor is further configured to calculate a new checksum based on the EPC and a retailer-specific number associated with a retailer that owns one or more RFID tags. The at least one processor is further configured to compare the new checksum with the checksum read from the RFID tag. The at least one processor is further configured to determine whether the RFID tag is owned by the retailer based on whether the new checksum matches the checksum read from the RFID tag.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a schematic diagram of a second example RFID encoding scheme which may be employed in an open supply chain, according to some aspects;

FIG. 5 is a schematic diagram of a second example RFID code generated by the second example RFID encoding scheme of FIG. 4, according to some aspects;

DETAILED DESCRIPTION

Figure 1:
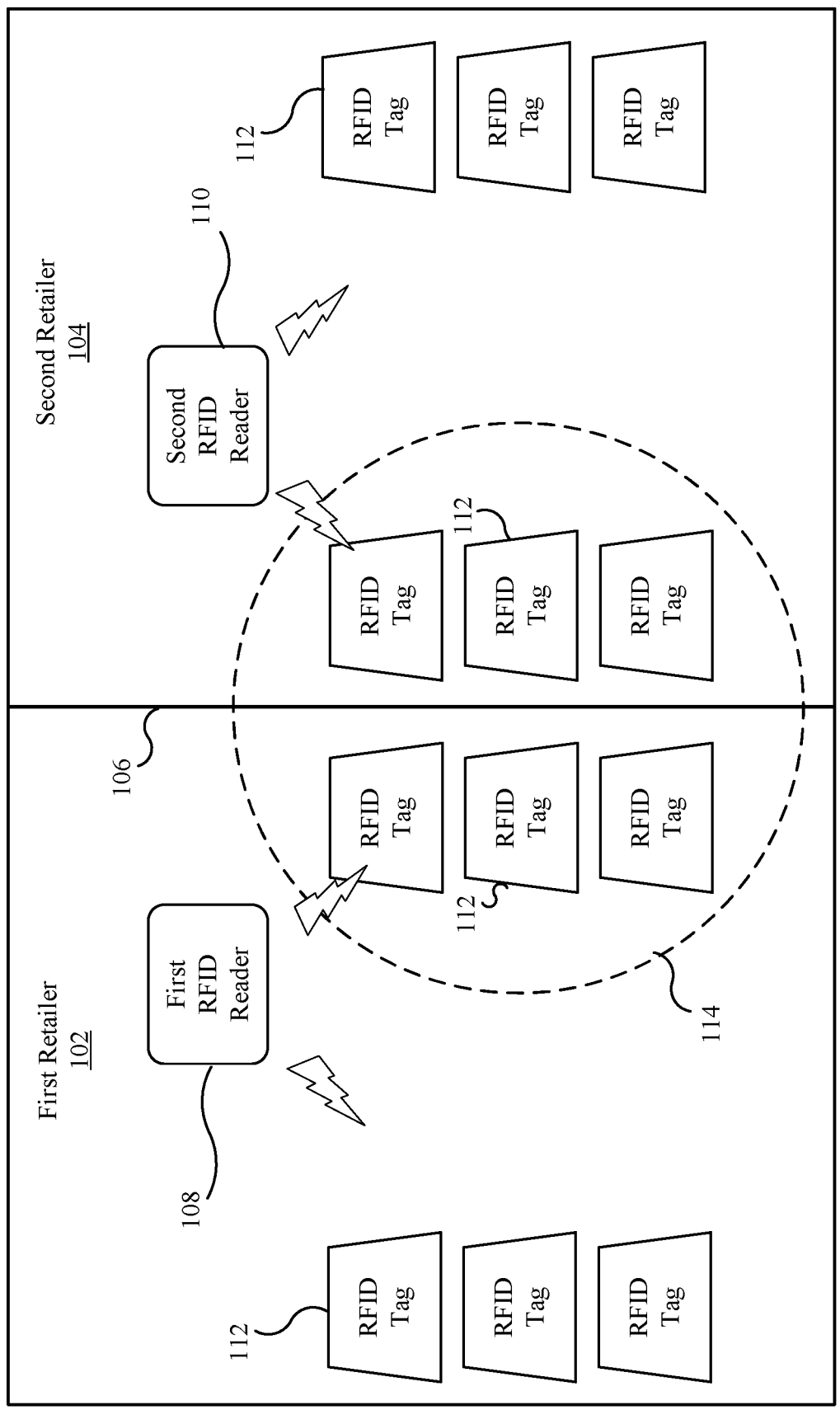
FIG. 1 is a schematic diagram of an example system including radio-frequency identification (RFID) tags and RFID readers located in neighboring retailers, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide radio-frequency identification (RFID) tags that allow for differentiating between tags of different retailers.

Generally, an electronic product code (EPC) may be encoded in the 96 bits of memory space available on a standard RFID tag attached to a product. The EPC includes (1) a header (to identify the intent of the tag); (2) a certificate (to identify the commissioning authority that wrote the tag); (3) a European Article Number 13 (EAN-13) product code (to identify the type of product the tag is attached to, e.g., the stock keeping unit (SKU)); and (4) a serial number (a unique number to the SKU that identifies the actual garment/product).

In some aspects, for example, the personnel at a retailer may use handheld RFID scanners/readers to scan RFID tags attached to merchandise to physically count the merchandise. In some aspects, the RFID scanners/readers may have a range of about 30 to 40 feet, and may operate at 2.4 GHz. Therefore, when two stores have a shared wall, the RFID scanners/readers used at one store may be able to unintentionally scan the RFID tags attached to the merchandise of the other store through the shared wall.

Generally, in an open supply chain (e.g., department stores who do not manufacture what they sell), a standards body GS1 allocates the numbers loaded on an RFID tag, and charges for these numbers. However, if two neighboring stores implement a closed supply chain (e.g., sell merchandise manufactured by themselves), they may not prefer to pay for expensive, globally registered GS1 numbers for their RFID tags, and may instead implement and use their own numbering schemes. As a result, the two stores may end up using the same numbering scheme (EAN-13) for two different product lines. Accordingly, if RFID tags are read through shared walls, such stores cannot tell the difference between their product and a product of the store next door, hence incorrect elevated levels of inventory may be reported.

In an aspect, for example, a store may encode the RFID tags using an EAN-13 which defines a 13 digit space. In an aspect, a store that implements a closed supply chain may load an eight digit number in the EAN-13 space, and five zeroes may be included in the remaining blank spaces. In an aspect, in order to differentiate between RFID tags of different retailers, the blank space may be filled with a retailer-specific secure checksum, for example, two digits, to validate the ownership of the RFID tag. Accordingly, different checksums may be associated with different retailers. In an aspect, an algorithm may be run over the RFID tag to compute the retailer-specific secure checksum that is different for each retailer and allows for determining the actual owner of the product associated with the RFID tag. Thereby, a virtual wall is provided between neighboring retailers so they don't pollute each other's inventory.

Specifically, in an aspect, for example, a space may be allocated in an RFID tag for the SKU which has a standard format and includes a 13 digit number. A retailer may generate an RFID tag for an article by placing the article number in the space allocated in the RFID tag for the SKU. In an aspect, the numbering scheme used by a retailer may not reach a 13 digit number. For example, the retailer may only use 8 digits of the space allocated in the RFID tag for the SKU. Therefore, since eight digits are used to fill a 13 digit space, the remaining 5 digits are filled with zeros. In an aspect, for example, the zeros are placed at the beginning to implement a left-padded numbering scheme. Accordingly, in one non-limiting aspect, for example, a nine digit space may be provided to a retailer for implementing their numbering scheme, and the remaining four digits may be used for including a retailer-specific secure checksum.

In an aspect, for example, a hash of the components of an RFID tag is calculated. In an aspect, the components of an EPC include a certificate (provided by the commissioning authority), an article number (SKU or EAN13), and a serial number. These three components are compounded with a retailer-specific number (acting as a secret key) and then inputted to an algorithm to generate a three or four digit retailer-specific secure checksum that is repeatable. The retailer-specific secure checksum is then loaded onto the spare space on the RFID tag. In an aspect, for example, a numbering scheme according to Committee on Uniform Securities Identification (CUSIP) may be used to generate the retailer-specific secure checksum (e.g., first number times 10, second number times 100, third number times 1,000, etc.).

In an aspect, for example, the retailer-specific number may be selected from triangular numbers (e.g., 3, 6, 10, 15, etc.) to generate different retailer-specific secure checksums for different retailers.

In one non-limiting aspect, for example, for a 96 bit RFID tag, the retailer-specific secure checksum is digitally imprinted on the chip within the RFID tag. When a handheld device reads the RFID tag, the retailer-specific secure checksum is read as well as other components on the RFID tag (e.g., certification, product code, and serial number). The components of the RFID tag are run through an algorithm along with the retailer-specific number to regenerate the secure checksum, and the regenerated secure checksum is compared against the retailer-specific secure checksum read from the RFID tag to determine if the RFID tag belongs to the retailer associated with the handheld scanner/reader that is counting merchandise. Accordingly, the retailer-specific number is used as a secret key so that two retailers with the exact same RFID tag have different retailer-specific secure checksums to validate ownership of RFID tags.

In an aspect, the provisioning of the retailer-specific (tenant-specific) numbers and/or the calculation of the corresponding retailer-specific secure checksums may be performed on a multi-tenant cloud-based system including a database shared and used by multiple tenants/retailers.

In an aspect, for example, in order to set the memory banks on an RFID tag with a 96 bit number, a handheld RFID scanner/reader issues a command to the RFID tag via radio signals to tell the RFID tag to imprint itself with the 96 bit number. Thereafter, a handheld RFID scanner/reader may query the memory bank in the RFID tag by sending a radio signal. In response, the RFID tag may receive the radio signal, farm the electricity from the radio signal to generate enough power within the RFID tag to provide a response back on the same radio frequency, and respond to the RFID scanner/reader with the 96 bit number.

In an aspect, a mobile device (e.g., an iPad or an iPod Touch device) may be directly connected to a handheld RFID scanner/reader and may run a software to interact with the RFID scanner/reader (e.g., via Bluetooth) to collect information from the RFID tags that are being read. The mobile device then transmits the information to a server providing an RFID-based solution for inventory management for a retailer that implements an open supply chain. In an aspect, a retailer attaches the RFID tags to merchandise and encodes the RFID tags via a commissioning authority at the time of manufacturing of the RFID tags. As such, when the RFID tags arrive at a store, the RFID tags may immediately be scanned to receive merchandise into the store and track movement of merchandise between the front of the house and the back of the house, as well as for electronic article surveillance (e.g., to prevent theft using alarm pedestals).

In an aspect, the multi-tenant cloud system may also provide the functionality of the commissioning authority. Alternatively, the supplier of the RFID tags may act as the commissioning authority.

In an aspect, the numbers loaded on an RFID tag may be configured according to various encoding schemes, such as EAN8 (an eight digit SKU), EAN11, GS1 (SG1096), etc. The particular type of encoding used for an RFID tag may be detected based on specific bits on the RFID tag. In alternative aspects, a retailer/customer/tenant may provision their own non-standard numbering scheme. However, the present aspects allow for differentiating between RFID tags of different retailers/customers/tenants that provision their own non-standard numbering scheme.

Turning now to the figures, example aspects are depicted with reference to one or more components described herein, where components in dashed lines may be optional.

Referring to FIG. 1, in one non-limiting aspect, a first retailer 102 and a second retailer 104 may have a shared wall 106 across which RFID signals can travel. For example, a first RFID reader 108 used at the first retailer 102 and a second RFID reader 110 used at the second retailer 104 may be able to scan any RFID tags 112 in a cross-read area 114 spanning across the shared wall 106 in the first retailer 102 and the second retailer 104. For example, the first RFID reader 108 may be able to scan one or more RFID tags 112 of the second retailer 104 that are within the cross-read area 114. Similarly, the second RFID reader 110 may be able to scan one or more RFID tags 112 of the first retailer 102 that are within the cross-read area 114.

In an aspect, when the first retailer 102 and the second retailer 104 use non-standardized RFID encoding, the first retailer 102 and the second retailer 104 face a significant risk in data pollution resulting from reading RFID tags 112 from a respective neighboring retailer. This data pollution causes inaccuracies in RFID-based inventory assessment. Some known systems mitigate this risk by setting up expensive physical shielding or by purchasing standardized RFID product codes from a global standards body (e.g., GS1). However, the first retailer 102 and the second retailer 104 may be closed supply chain retailers, and the cost of physical shielding or standardized RFID product codes may negatively impact the return on investment. As such, in some present aspects, the first retailer 102 and the second retailer 104 may leverage retailer-specific algorithmic RFID encoding in conjunction with either reader-side (client-side) or server-side validation, in order to overcome both the cost and the inaccuracies of the current schemes. Further details are provided below with reference to various non-limiting aspects.

Figure 2:
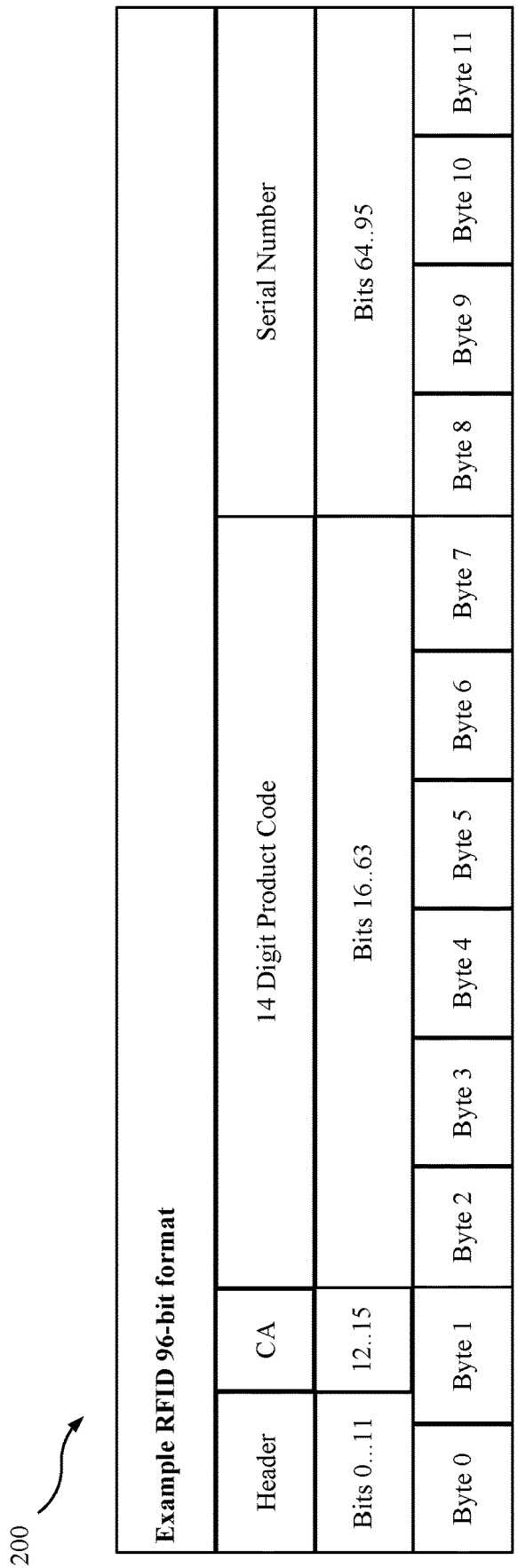
FIG. 2 is a schematic diagram of a first example RFID encoding scheme which may be employed in a closed supply chain, according to some aspects.
Figure 3:
FIG. 3 is a schematic diagram of a first example RFID code generated by the first example RFID encoding scheme of FIG. 2, according to some aspects.

FIG. 2 is a first example RFID encoding scheme 200 employed in closed supply chains. The first example RFID encoding scheme 200 includes 96 bits, where bits 0 to 11 are allocated for a header, bits 12 to 15 are allocated for a certificate issued by the commissioning authority (CA), bits 16 to 63 are allocated for a 14 digit product code, and bits 64 to 95 are allocated for a serial number. FIG. 3 is a first example RFID code 300 generated according to the first example RFID encoding scheme 200 of FIG. 2.

FIG. 4 is a second example RFID encoding scheme 400 employed in an open supply chain according to some present aspects. The second example RFID encoding scheme 400 includes 96 bits, where bits 0 to 11 are allocated for a header, bits 12 to 15 are allocated for a certificate issued by the commissioning authority (CA), bits 16 to 28 are allocated for a checksum, bits 29 to 63 are allocated for a 9 digit product code, and bits 64 to 95 are allocated for a serial number.

FIG. 5 is a second example RFID code 500 generated for the first retailer 102 (FIG. 1) according to the second example RFID encoding scheme 400 of FIG. 4. In the second example RFID code 500, a retailer-specific number=3 is used to generate the checksum in bits 16 to 28.

Figure 6:
FIG. 6 is a schematic diagram of a third example RFID code generated by the second example RFID encoding scheme of FIG. 4, according to some aspects.

FIG. 6 is a third example RFID code 600 for the second retailer 104 (FIG. 1) generated according to the second example RFID encoding scheme 400 of FIG. 4. In the third example RFID code 600, a retailer-specific number=6 is used to generate the checksum in bits 16 to 28.

Accordingly, although the second example RFID code 500 implemented at the first retailer 102 and the third example RFID code 600 implemented at the second retailer 104 include the same header, CA, product code, and serial number, they include different checksums generated based on different retailer-specific numbers.

In an aspect, for example, the following functionality may be implemented to generate the secure retailer-specific checksum for an RFID tag:

$$\text{Checksum}=\text{MOD}((CA*10+PC*100+SER*1000)*\text{Retailer-Specific Number},4096)$$

where "CA" is the certificate issued by the commissioning authority, "PC" is the product code, and "SER" is the serial number.

Figure 7:
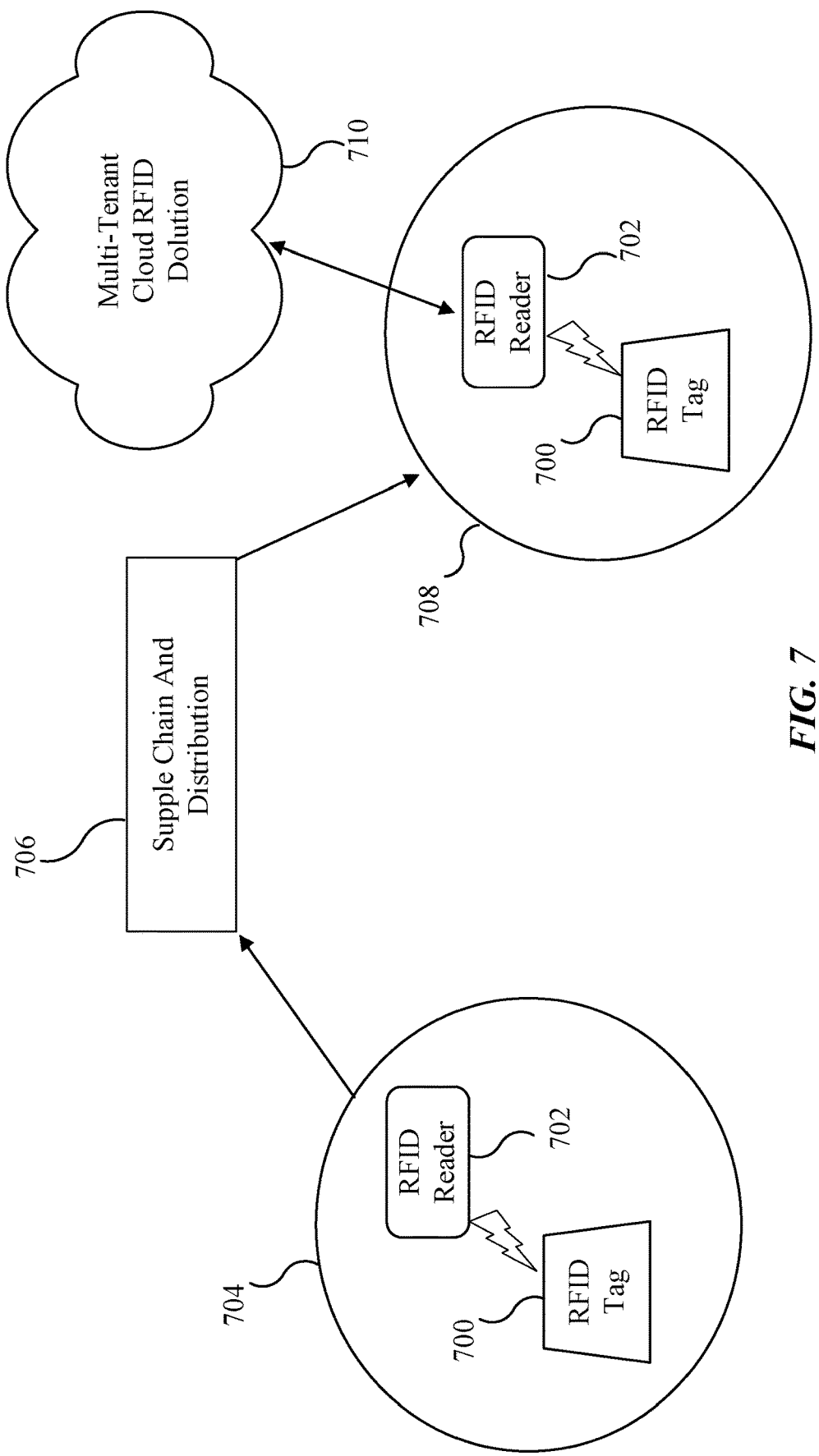
FIG. 7 is a schematic diagram of an example lifecycle of an RFID tag, according to some aspects.

FIG. 7 is an example lifecycle of an RFID tag 700. Using an RFID reader 702, the RFID tag 700 is encoded 704 at a location 704 such as an article manufacturer, a distribution center, a store, etc. The RFID tag 700 then goes through supply chain and distribution 706 to reach a client site 708 (e.g., a store location) where the RFID tag 700 is validated by being read by another RFID reader 702 (e.g., a combination of an RFID sled and a mobile device, or a fixed RFID reader), which may communicate with a multi-tenant cloud RFID solution 710 to implement server-side or client-side validation as described below with reference to FIGS. 8-12.

Figure 8:
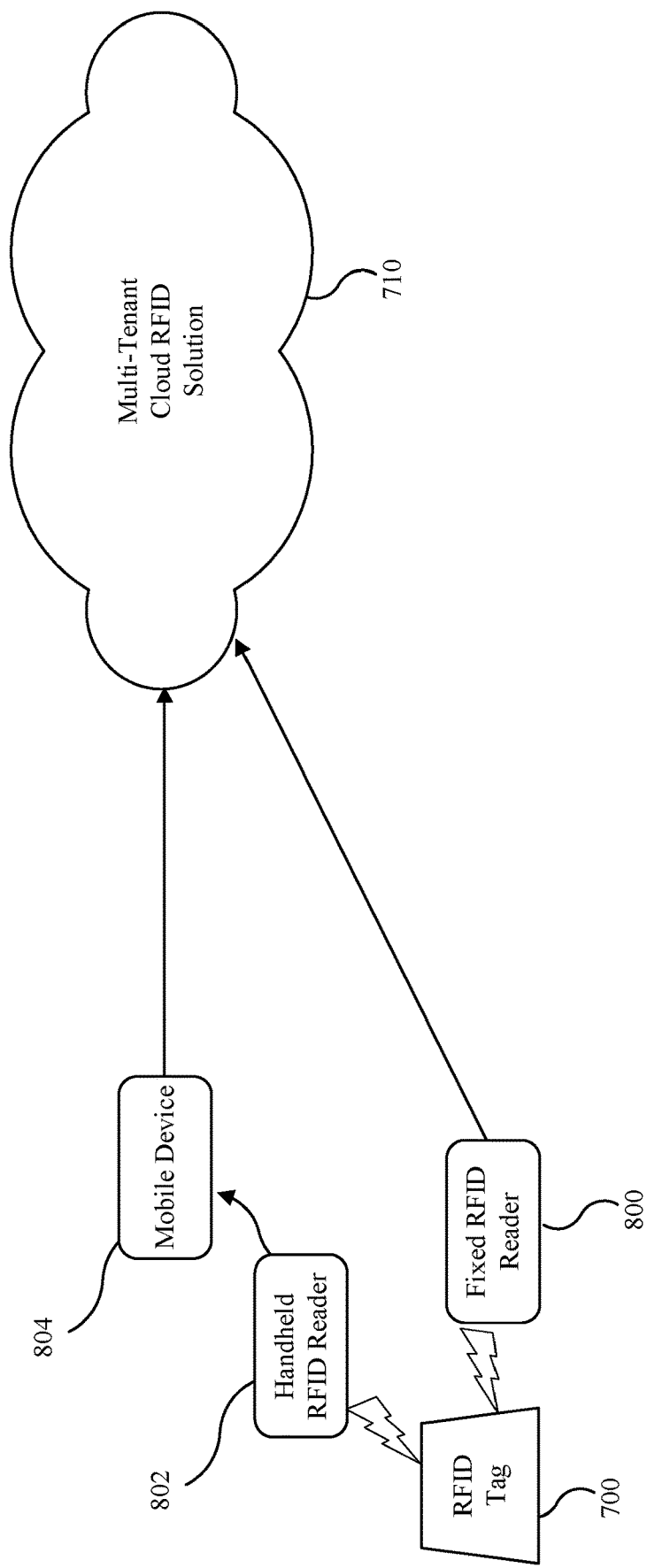
FIG. 8 is a schematic diagram of an example server-side validation for an RFID tag, according to some aspects.

In one non-limiting aspect, for example, referring to FIG. 8, server-side validation may be performed for the RFID tag 700. In an aspect, for example, the RFID tag 700 may be read by a fixed RFID reader 800, which submits the unfiltered reading to the multi-tenant cloud RFID solution 710.

Alternatively, the RFID tag 700 may be read by a handheld RFID reader 802, which sends the unfiltered reading to a mobile device 804, which sends the unfiltered reading to the multi-tenant cloud RFID solution 710. The multi-tenant cloud RFID solution 710 then performs algorithmic validation of the readings.

Figure 9:
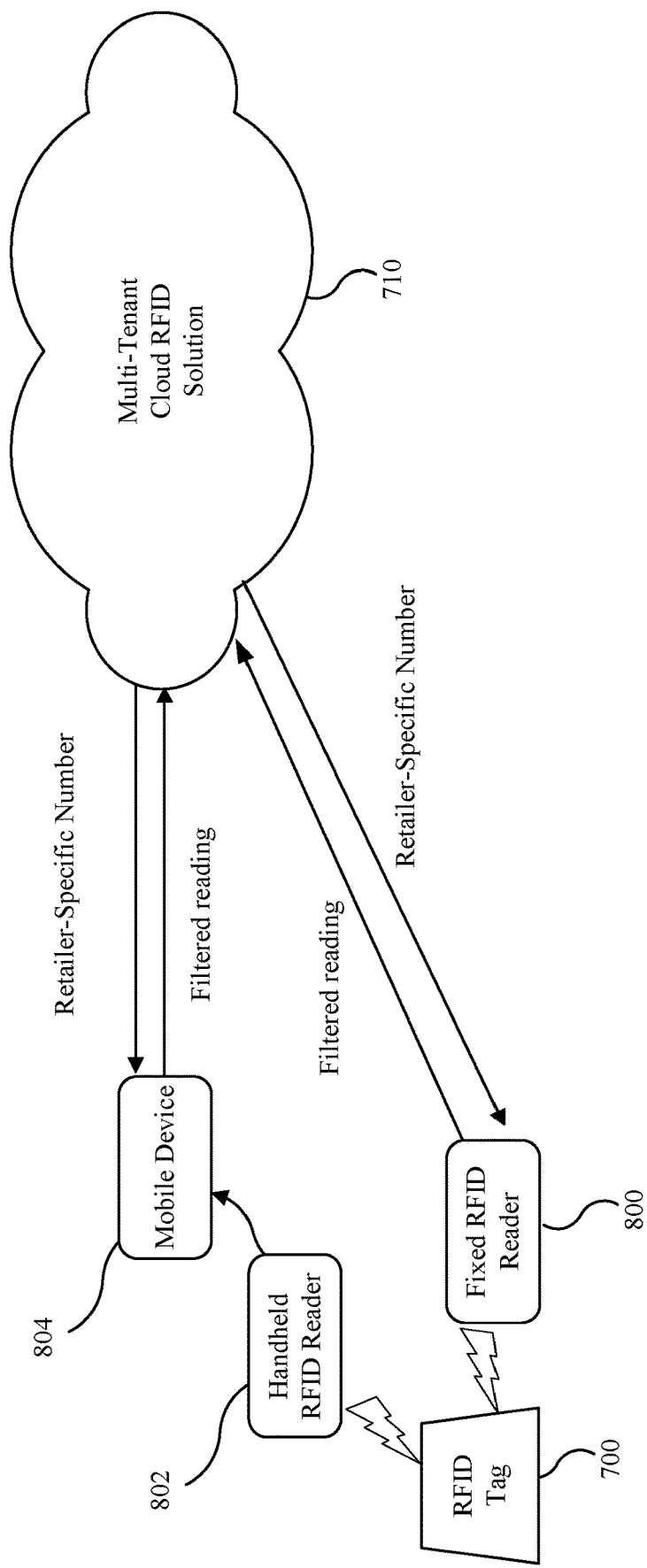
FIG. 9 is a schematic diagram of an example client-side validation for an RFID tag, according to some aspects.

In another non-limiting aspect, for example, referring to FIG. 9, client-side validation may be performed for the RFID tag 700. In an aspect, for example, the multi-tenant cloud RFID solution 710 may communicate the retailer-specific number to the fixed RFID reader 800 for client-side validation. Subsequently, the RFID tag 700 is read by the fixed RFID reader 800, which performs algorithmic validation of the reading and submits the resulting filtered reading to the multi-tenant cloud RFID solution 710. Alternatively, the multi-tenant cloud RFID solution 710 may communicate the retailer-specific number to the mobile device 804 for client-side validation. Subsequently, the RFID tag 700 is read by the handheld RFID reader 802, which sends the unfiltered reading to the mobile device 804, which performs algorithmic validation of the reading and sends the resulting filtered reading to the multi-tenant cloud RFID solution 710.

Figure 10:
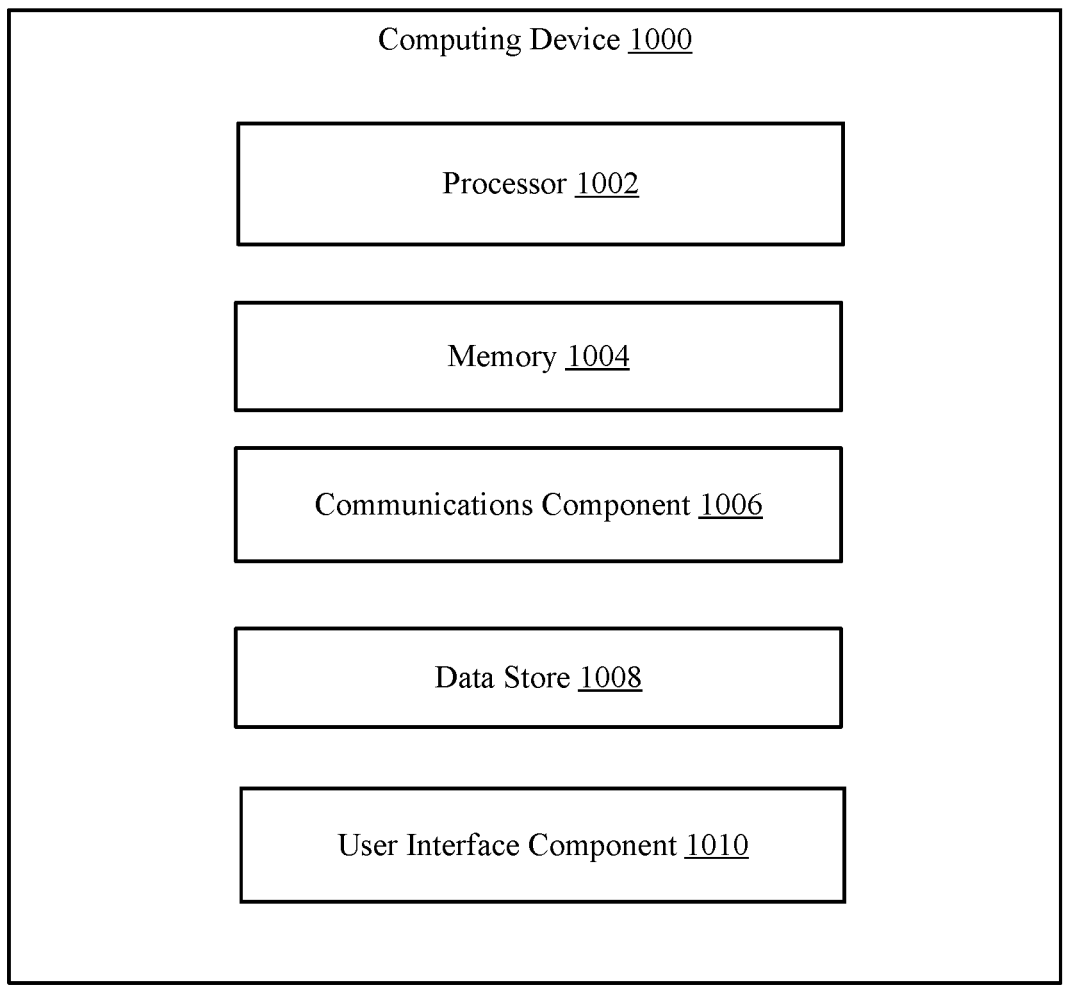
FIG. 10 is a block diagram of an example computing device which may implement all or a portion of an RFID tag, an RFID reader, one or more components in a multi-tenant cloud RFID solution, a mobile device, or any other component/entity in FIGS. 1-9, according to some aspects.

FIG. 10 illustrates an example block diagram providing details of computing components in a computing device 1000 that may implement all or a portion of an RFID tag 112, 700, an RFID reader 108, 110, 702, 800, 802, one or more components in the multi-tenant cloud RFID solution 710, the mobile device 804, or any other component described above. The computing device 1000 includes a processor 1002 which may be configured to execute or implement software, hardware, and/or firmware modules that perform any RFID-related or other functionality described above with reference to an RFID tag 112, 700, an RFID reader 108, 110, 702, 800, 802, one or more components in the multi-tenant cloud RFID solution 710, the mobile device 804, or any other component described above.

The processor 1002 may be a micro-controller and/or may include a single or multiple set of processors or multi-core processors. Moreover, the processor 1002 may be implemented as an integrated processing system and/or a distributed processing system. The computing device 1000 may further include a memory 1004, such as for storing local versions of applications being executed by the processor 1002, related instructions, parameters, etc. The memory 1004 may include a type of memory usable by a computer, such as random access memory (RAM), read only memory (ROM), tapes, magnetic discs, optical discs, volatile memory, non-volatile memory, and any combination thereof. Additionally, the processor 1002 and the memory 1004 may include and execute an operating system executing on the processor 1002, one or more applications, display drivers, etc., and/or other components of the computing device 1000.

Further, the computing device 1000 may include a communications component 1006 that provides for establishing and maintaining communications with one or more other devices, parties, entities, etc., utilizing hardware, software, and services. The communications component 1006 may carry communications between components on the computing device 1000, as well as between the computing device 1000 and external devices, such as devices located across a communications network and/or devices serially or locally connected to the computing device 1000. For example, the communications component 1006 may include one or more buses, and may further include transmit chain components and receive chain components associated with a wireless or wired transmitter and receiver, respectively, operable for interfacing with external devices.

Additionally, the computing device 1000 may include a data store 1008, which can be any suitable combination of hardware and/or software, that provides for mass storage of information, databases, and programs. For example, the data store 1008 may be or may include a data repository for applications and/or related parameters not currently being executed by processor 1002. In addition, the data store 1008 may be a data repository for an operating system, application, display driver, etc., executing on the processor 1002, and/or one or more other components of the computing device 1000.

The computing device 1000 may also include a user interface component 1010 operable to receive inputs from a user of the computing device 1000 and further operable to generate outputs for presentation to the user (e.g., via a display interface to a display device). The user interface component 1010 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 1010 may include one or more output devices, including but not limited to a display interface, a speaker, a haptic feedback mechanism, a printer, any other mechanism capable of presenting an output to a user, or any combination thereof.

Figure 11:
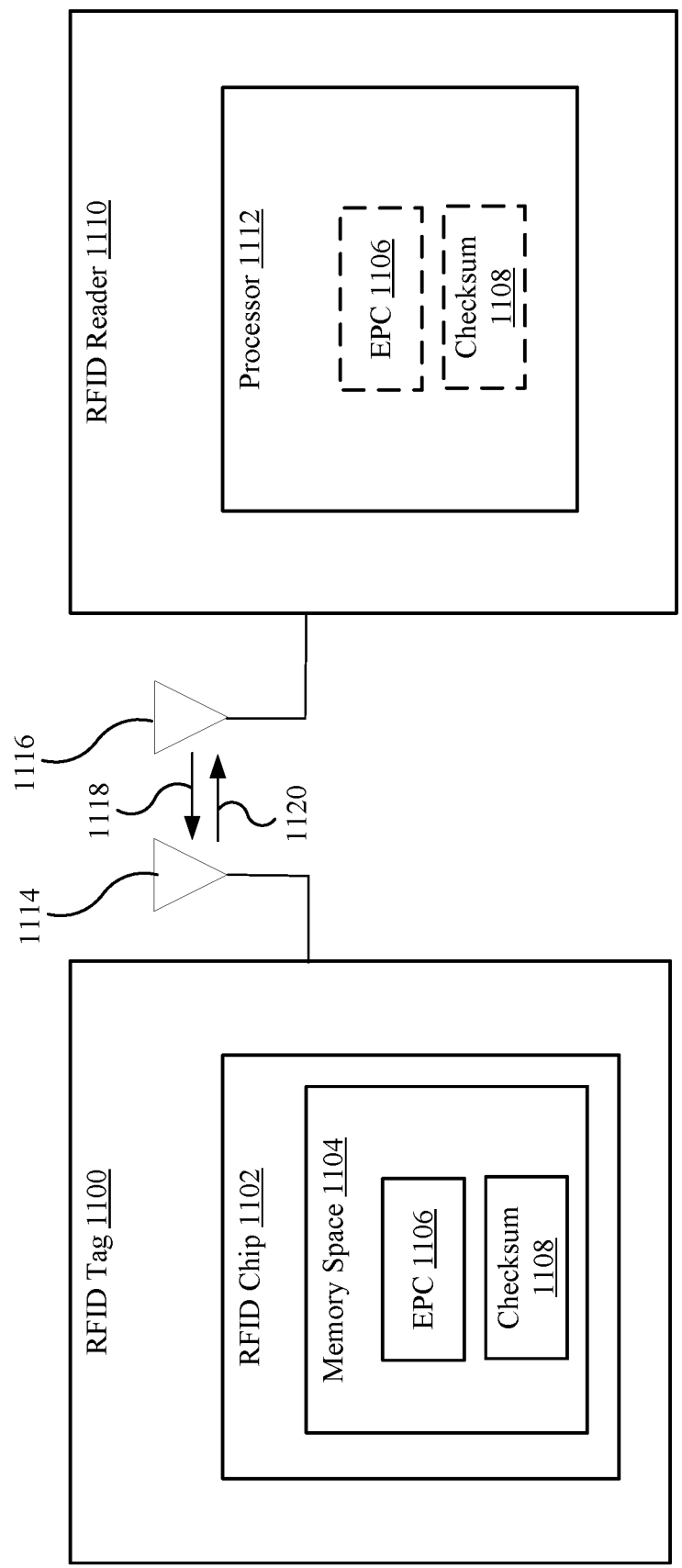
FIG. 11 is a schematic diagram of an example RFID system including an RFID tag and an RFID reader, according to some aspects.

FIG. 11 illustrates an example block diagram providing details of some of the components in an RFID tag 1100 and an RFID reader 1110 in communication with one another. The RFID tag 1100 may implement all or a portion of the RFID tag 112 in FIG. 1 or the RFID tag 700 in any of FIGS. 7 to 9. The RFID reader 1110 may implement all or a portion of the first RFID reader 108 or the second RFID reader 110 in FIG. 1, the RFID reader 702 in FIG. 7, or the fixed RFID reader 800 or the handheld RFID reader 802 in FIG. 8 or 9.

The RFID tag 1100 includes an RFID chip 1102, which includes a memory space 1104 in which an EPC 1106 and a retailer-specific checksum 1108 are loaded, as described herein with reference to various example aspects in FIGS. 1-10. The RFID tag 1100 also includes an antenna 1114 configured to receive RFID interrogation signals 1118 and transmit RFID response signals 1120 in response to the RFID interrogation signals 1118, where the RFID response signals 1120 include the EPC 1106 and the retailer-specific checksum 1108.

The RFID reader 1110 includes an antenna 1116 configured to radiate RFID interrogation signals 1118 and receive RFID response signals 1120 from the RFID tag 1120 in response to the RFID interrogation signals 1118. The RFID reader 1110 also includes a processor 1112 that receives the EPC 1106 and the retailer-specific checksum 1108 included in the RFID response signals 1120 to determine an ownership of the RFID tag 1100, as described herein with reference to various example aspects in FIGS. 1-10.

Figure 12:
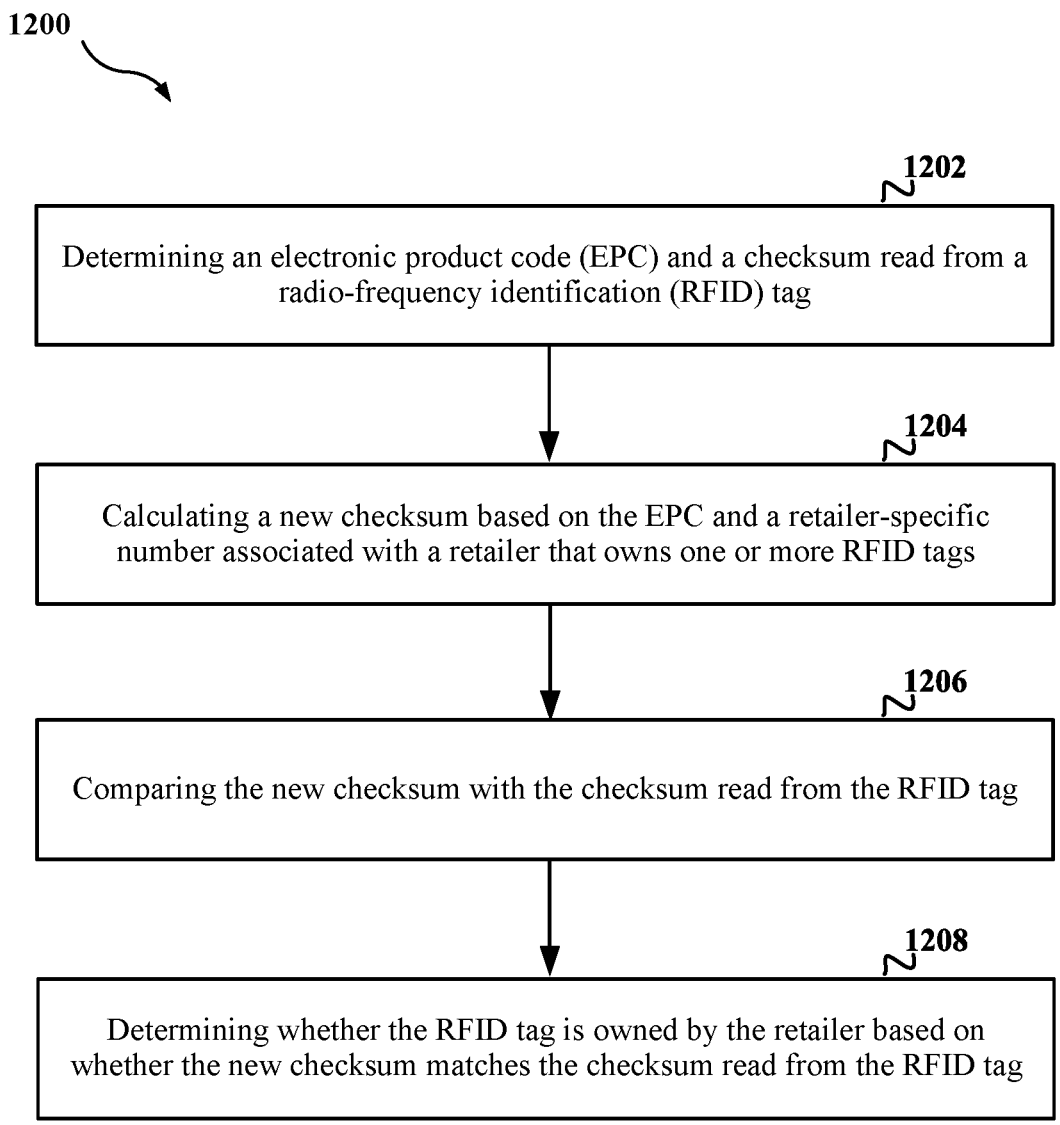
FIG. 12 is a flow diagram of an example RFID method, according to some aspects.

FIG. 12 is a flowchart of a method 1200 of operation of an RFID reader 108, 110, 702, 800, 802, 1110, one or more components in the multi-tenant cloud RFID solution 710, the mobile device 804, the computing device 1000, or any other component described above. The method 1200 may implement the functionality described herein with reference to FIGS. 1-11 above, and may be performed by one or more components of an RFID reader 108, 110, 702, 800, 802, 1110, one or more components in the multi-tenant cloud RFID solution 710, the mobile device 804, the computing device 1000, or any other component described herein with reference to FIGS. 1-11 above.

At 1202, the method 1200 includes determining an EPC and a checksum read from an RFID tag. For example, in an aspect, referring to FIG. 8 or 9, the fixed RFID reader 800 or the handheld RFID reader 802 may scan the RFID tag 700 to determine an EPC and a checksum loaded onto the RFID tag 700.

At 1204, the method 1204 further includes calculating a new checksum based on the EPC and a retailer-specific number associated with a retailer that owns one or more RFID tags. For example, in an aspect, referring to FIG. 9, the fixed RFID reader 800 may be associated with a retailer to whom a retailer-specific number is assigned. In this case, the fixed RFID reader 800 may calculate a new checksum based on the EPC read from the RFID tag 700 and the retailer-specific number of the retailer associated with the fixed RFID reader 800. Alternatively, in an aspect, referring to FIG. 8, the fixed RFID reader 800 may send the EPC and the checksum read from the RFID tag 700 to a multi-tenant cloud RFID solution 710, which calculates a new checksum based on the EPC read from the RFID tag 700 and the retailer-specific number of the retailer associated with the fixed RFID reader 800. In an alternative aspect, referring to FIG. 9, the handheld RFID reader 802 may be associated with a retailer to whom a retailer-specific number is assigned. In this case, the handheld RFID reader 802 may send the EPC and the checksum read from the RFID tag 700 to a mobile device 804. The mobile device 804 may then calculate a new checksum based on the EPC read from the RFID tag 700 and the retailer-specific number of the retailer associated with the handheld RFID reader 802. Alternatively, in an aspect, referring to FIG. 8, the mobile device 804 may send the EPC and the checksum read from the RFID tag 700 to a multi-tenant cloud RFID solution 710, which calculates a new checksum based on the EPC read from the RFID tag 700 and the retailer-specific number of the retailer associated with the handheld RFID reader 802.

At 1206, the method 1200 further includes comparing the new checksum with the checksum read from the RFID tag. For example, referring to FIG. 9, in aspects where the fixed RFID reader 800 calculates the new checksum, the fixed RFID reader 800 may compare the new checksum with the checksum read from the RFID tag 700. Alternatively, referring to FIG. 8, in aspects where the multi-tenant cloud RFID solution 710 calculates the new checksum, the multi-tenant cloud RFID solution 710 may compare the new checksum with the checksum read from the RFID tag 700. Alternatively, referring to FIG. 9, in aspects where the mobile device 804 calculates the new checksum, the mobile device 804 may compare the new checksum with the checksum read from the RFID tag 700.

At 1208, the method 1200 further includes determining whether the RFID tag is owned by the retailer based on whether the new checksum matches the checksum read from the RFID tag. For example, referring to FIG. 9, in aspects where the fixed RFID reader 800 calculates the new checksum, the fixed RFID reader 800 may determine whether the RFID tag 700 is owned by the retailer associated with the fixed RFID reader 800 based on whether the new checksum matches the checksum read from the RFID tag 700. Alternatively, referring to FIG. 8, in aspects where the multi-tenant cloud RFID solution 710 calculates the new checksum, the multi-tenant cloud RFID solution 710 may determine whether the RFID tag 700 is owned by the retailer associated with the fixed RFID reader 800 or the handheld RFID reader 802 based on whether the new checksum matches the checksum read from the RFID tag 700. Alternatively, referring to FIG. 9, in aspects where the mobile device 804 calculates the new checksum, the mobile device 804 may determine whether the RFID tag 700 is owned by the retailer associated with the handheld RFID reader 802 based on whether the new checksum matches the checksum read from the RFID tag 700.

Optionally, in some aspects, determining the EPC and the checksum may further include scanning the RFID tag 700 by the fixed RFID reader 802 or by the handheld RFID reader 802.

Optionally, in some aspects, determining the EPC and the checksum may further include reading, by the fixed RFID reader 802 or by the handheld RFID reader 802, the EPC and the checksum from the RFID tag 700.

Optionally, in some aspects, calculating the new checksum may include calculating by the fixed RFID reader 802 or by the handheld RFID reader 802.

Optionally, in some aspects, comparing the new checksum with the checksum read from the RFID tag 700 may include comparing by the fixed RFID reader 802 or by the handheld RFID reader 802.

Optionally, in some aspects, determining whether the RFID tag 700 is owned by the retailer may include determining by the fixed RFID reader 802 or by the handheld RFID reader 802.

Optionally, in some aspects, the method 1200 may further include receiving the retailer-specific number by the RFID reader from a cloud system. For example, referring to FIG. 9, in aspects where the fixed RFID reader 800 calculates the new checksum, the fixed RFID reader 800 may receive the retailer-specific number of the retailer associated with the fixed RFID reader 800 from the multi-tenant cloud RFID solution 710. Alternatively, referring to FIG. 9, in aspects where the mobile device 804 calculates the new checksum, the mobile device 804 may receive the retailer-specific number of the retailer associated with the handheld RFID reader 802 from the multi-tenant cloud RFID solution 710.

Optionally, in some aspects, determining the EPC and the checksum may include receiving the EPC and the checksum by a cloud system, such as the multi-tenant cloud RFID solution 710.

Optionally, in some aspects, receiving the EPC and the checksum may include receiving the EPC and the checksum by a cloud system, such as the multi-tenant cloud RFID solution 710, from an RFID reader, such as the fixed RFID reader 800.

Optionally, in some aspects, receiving the EPC and the checksum may include receiving the EPC and the checksum by a cloud system, such as the multi-tenant cloud RFID solution 710, from a mobile device that is in communication with an RFID reader, such as the mobile device 804 that is in communication with the handheld RFID reader 802.

Optionally, in some aspects, calculating the new checksum may include calculating by a cloud system, such as the multi-tenant cloud RFID solution 710.

Optionally, in some aspects, comparing the new checksum with the checksum read from the RFID tag may include comparing by a cloud system, such as the multi-tenant cloud RFID solution 710.

Optionally, in some aspects, determining whether the RFID tag is owned by the retailer may include determining by a cloud system, such as the multi-tenant cloud RFID solution 710.

Optionally, in some aspects, determining the EPC and the checksum may include receiving the EPC and the checksum by a mobile device, such as the mobile device 804, from an RFID reader, such as the handheld RFID reader 802.

Optionally, in some aspects, calculating the new checksum may include calculating by the mobile device 804.

Optionally, in some aspects, comparing the new checksum with the checksum read from the RFID tag may include comparing by the mobile device 804.

Optionally, in some aspects, determining whether the RFID tag is owned by the retailer associated with the handheld RFID reader 802 may include determining by the mobile device 804.

Optionally, in some aspects, the method 1200 may further include receiving the retailer-specific number of the retailer associated with the handheld RFID reader 802 by the mobile device 804 from a cloud system, such as the multi-tenant cloud RFID solution 710.

Optionally, in some aspects, the EPC may include a header, a certification issued by a commissioning authority, a European Article Number 13 (EAN-13) product code that identifies a product type, and a serial number that identifies a product.

Optionally, in some aspects, the EPC may be configured according to a closed supply chain encoding scheme.

Some further aspects include:

1. A method comprising:
determining an electronic product code (EPC) and a checksum read from a radio-frequency identification (RFID) tag;
calculating a new checksum based on the EPC and a retailer-specific number associated with a retailer that owns one or more RFID tags;
comparing the new checksum with the checksum read from the RFID tag; and
determining whether the RFID tag is owned by the retailer based on whether the new checksum matches the checksum read from the RFID tag.

2. The method of clause 1, wherein determining the EPC and the checksum comprises:
scanning the RFID tag by an RFID reader; and
reading, by the RFID reader, the EPC and the checksum from the RFID tag.

3. The method of any of clauses 1 or 2,
wherein calculating the new checksum comprises calculating by the RFID reader;
wherein comparing the new checksum with the checksum read from the RFID tag comprises comparing by the RFID reader; and
wherein determining whether the RFID tag is owned by the retailer comprises determining by the RFID reader.

4. The method of any of clauses 1 to 3, further comprising receiving the retailer-specific number by the RFID reader from a cloud system.

5. The method of clause 1, wherein determining the EPC and the checksum comprises receiving the EPC and the checksum by a cloud system.

6. The method of any of clauses 1 or 5, wherein receiving the EPC and the checksum comprises receiving the EPC and the checksum by the cloud system from an RFID reader.

7. The method of any of clauses 1 or 5, wherein receiving the EPC and the checksum comprises receiving the EPC and the checksum by the cloud system from a mobile device that is in communication with an RFID reader.

8. The method of any of clauses 1 or 5-7,
wherein calculating the new checksum comprises calculating by the cloud system;
wherein comparing the new checksum with the checksum read from the RFID tag comprises comparing by the cloud system; and
wherein determining whether the RFID tag is owned by the retailer comprises determining by the cloud system.

9. The method of clause 1, wherein determining the EPC and the checksum comprises receiving the EPC and the checksum by a mobile device from an RFID reader.

10. The method of any of clauses 1 or 9,
wherein calculating the new checksum comprises calculating by the mobile device;
wherein comparing the new checksum with the checksum read from the RFID tag comprises comparing by the mobile device; and
wherein determining whether the RFID tag is owned by the retailer comprises determining by the mobile device.

11. The method of any of clauses 1 or 9 or 10, further comprising receiving the retailer-specific number by the mobile device from a cloud system.

12. The method of any of the above clauses 1 to 11, wherein the EPC includes a header, a certification issued by a commissioning authority, a European Article Number 13 (EAN-13) product code that identifies a product type, and a serial number that identifies a product.

13. The method of any of the above clauses 1 to 12, wherein the EPC is configured according to a closed supply chain encoding scheme.

14. A radio-frequency identification (RFID) tag comprising:
an antenna; and
an RFID chip coupled with the antenna,
wherein the RFID chip includes a memory space,
wherein the memory space is loaded with an electronic product code (EPC) and a checksum,
wherein the checksum is calculated based on the EPC and a retailer-specific number associated with a retailer that owns the RFID tag.

15. The RFID tag of clause 14, wherein the EPC includes a header, a certification issued by a commissioning authority, a European Article Number 13 (EAN-13) product code that identifies a product type, and a serial number that identifies a product.

16. The RFID tag of any of clauses 14 or 15, wherein the EPC is configured according to a closed supply chain encoding scheme.

17. A radio-frequency identification (RFID) reader comprising:
an antenna configured to radiate RFID interrogation signals and receive RFID response signals from an RFID tag in response to the RFID interrogation signals; and
a processor coupled with the antenna, wherein the processor is configured to:
determine, based on the RFID response signals received from the RFID tag, an electronic product code (EPC) and a checksum that have been loaded onto the RFID tag;
calculate a new checksum based on the EPC and a retailer-specific number associated with a retailer that owns one or more RFID tags;
compare the new checksum with the checksum read from the RFID tag; and
determine whether the RFID tag is owned by the retailer based on whether the new checksum matches the checksum read from the RFID tag.

18. The RFID reader of clause 17, wherein the processor is further configured to receive the retailer-specific number from a cloud system.

19. A cloud system comprising:
at least one memory; and
at least one processor coupled with the at least one memory, wherein the at least one processor is configured to:
receive an electronic product code (EPC) and a checksum read from a radio-frequency identification (RFID) tag;
calculate a new checksum based on the EPC and a retailer-specific number associated with a retailer that owns one or more RFID tags;
compare the new checksum with the checksum read from the RFID tag; and
determine whether the RFID tag is owned by the retailer based on whether the new checksum matches the checksum read from the RFID tag.

20. The cloud system of clause 19, wherein the at least one processor is further configured to receive the EPC and the checksum from an RFID reader.

21. The cloud system of clause 19, wherein the at least one processor is further configured to receive the EPC and the checksum from a mobile device that is in communication with an RFID reader.

22. A mobile device comprising:
at least one memory; and
at least one processor coupled with the memory, wherein the at least one processor is configured to:
receive an electronic product code (EPC) and a checksum read from a radio-frequency identification (RFID) tag;
calculate a new checksum based on the EPC and a retailer-specific number associated with a retailer that owns one or more RFID tags;
compare the checksum read from the RFID tag with the new checksum; and
determine whether the RFID tag is owned by the retailer based on whether the new checksum matches the checksum read from the RFID tag.

23. The mobile device of clause 22, wherein the at least one processor is further configured to receive the retailer-specific number from a cloud system.

24. The mobile device of any of clauses 22 or 23, wherein the at least one processor is further configured to receive the EPC and the checksum from an RFID reader.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
determining an electronic product code (EPC) and a checksum read from a radio-frequency identification (RFID) tag;
calculating a new checksum based on the EPC and a retailer-specific number associated with a retailer that has generated one or more RFID tags by:
loading, onto a first portion of a space allocated for a stock keeping unit (SKU) in each of the one or more RFID tags, a respective article number associated with that RFID tag; and
loading, onto a second portion of the space allocated for the SKU in each of the one or more RFID tags, a respective checksum that is calculated based on the retailer-specific number and a respective EPC associated with that RFID tag;
comparing the new checksum with the checksum read from the RFID tag; and
determining whether the RFID tag is generated by the retailer based on whether the new checksum matches the checksum read from the RFID tag.

2. The method of claim 1, wherein determining the EPC and the checksum comprises:
scanning the RFID tag by an RFID reader; and
reading, by the RFID reader, the EPC and the checksum from the RFID tag.

3. The method of claim 2,
wherein calculating the new checksum comprises calculating by the RFID reader;
wherein comparing the new checksum with the checksum read from the RFID tag comprises comparing by the RFID reader; and
wherein determining whether the RFID tag is owned by the retailer comprises determining by the RFID reader.

4. The method of claim 3, further comprising receiving the retailer-specific number by the RFID reader from a cloud system.

5. The method of claim 1, wherein determining the EPC and the checksum comprises receiving the EPC and the checksum by a cloud system.

6. The method of claim 5, wherein receiving the EPC and the checksum comprises receiving the EPC and the checksum by the cloud system from an RFID reader.

7. The method of claim 5, wherein receiving the EPC and the checksum comprises receiving the EPC and the checksum by the cloud system from a mobile device that is in communication with an RFID reader.

8. The method of claim 5,
wherein calculating the new checksum comprises calculating by the cloud system;
wherein comparing the new checksum with the checksum read from the RFID tag comprises comparing by the cloud system; and wherein determining whether the RFID tag is owned by the retailer comprises determining by the cloud system.

9. The method of claim 1, wherein determining the EPC and the checksum comprises receiving the EPC and the checksum by a mobile device from an RFID reader.

10. The method of claim 9,
wherein calculating the new checksum comprises calculating by the mobile device;
wherein comparing the new checksum with the checksum read from the RFID tag comprises comparing by the mobile device; and
wherein determining whether the RFID tag is owned by the retailer comprises determining by the mobile device.

11. The method of claim 10, further comprising receiving the retailer-specific number by the mobile device from a cloud system.

12. The method of claim 1, wherein the EPC includes a header, a certification issued by a commissioning authority, a European Article Number 13 (EAN-13) product code that identifies a product type, and a serial number that identifies a product.

13. The method of claim 1, wherein the EPC is configured according to a closed supply chain encoding scheme that uses numbers other than globally registered RFID tag numbers.

14. A radio-frequency identification (RFID) tag comprising:
an antenna; and
an RFID chip coupled with the antenna,
wherein the RFID chip includes a memory space,
wherein the memory space is loaded with an electronic product code (EPC) and a checksum,
wherein the checksum is calculated based on the EPC and a retailer-specific number associated with a retailer that has generated the RFID tag by:
loading, onto a first portion of a space allocated for a stock keeping unit (SKU) in the RFID tag, an article number associated with the RFID tag; and
loading the checksum onto a second portion of the space allocated for the SKU in the RFID tag.

15. The RFID tag of claim 14, wherein the EPC includes a header, a certification issued by a commissioning authority, a European Article Number 13 (EAN-13) product code that identifies a product type, and a serial number that identifies a product.

16. The RFID tag of claim 14, wherein the EPC is configured according to a closed supply chain encoding scheme that uses numbers other than globally registered RFID tag numbers.

17. A radio-frequency identification (RFID) reader comprising:
an antenna configured to radiate RFID interrogation signals and receive RFID response signals from an RFID tag in response to the RFID interrogation signals; and
a processor coupled with the antenna, wherein the processor is configured to:
determine, based on the RFID response signals received from the RFID tag, an electronic product code (EPC) and a checksum that have been loaded onto the RFID tag;
calculate a new checksum based on the EPC and a retailer-specific number associated with a retailer that has generated one or more RFID tags by:
loading, onto a first portion of a space allocated for a stock keeping unit (SKU) in each of the one or more RFID tags, a respective article number associated with that RFID tag; and
loading, onto a second portion of the space allocated for the SKU in each of the one or more RFID tags, a respective checksum that is calculated based on the retailer-specific number and a respective EPC associated with that RFID tag;
compare the new checksum with the checksum read from the RFID tag; and
determine whether the RFID tag is generated by the retailer based on whether the new checksum matches the checksum read from the RFID tag.

18. The RFID reader of claim 17, wherein the processor is further configured to receive the retailer-specific number from a cloud system.

19. A cloud system comprising:
at least one memory; and
at least one processor coupled with the at least one memory, wherein the at least one processor is configured to:
receive an electronic product code (EPC) and a checksum read from a radio-frequency identification (RFID) tag;
calculate a new checksum based on the EPC and a retailer-specific number associated with a retailer that has generated one or more RFID tags by:
loading, onto a first portion of a space allocated for a stock keeping unit (SKU) in each of the one or more RFID tags, a respective article number associated with that RFID tag; and
loading, onto a second portion of the space allocated for the SKU in each of the one or more RFID tags, a respective checksum that is calculated based on the retailer-specific number and a respective EPC associated with that RFID tag;
compare the new checksum with the checksum read from the RFID tag; and
determine whether the RFID tag is generated by the retailer based on whether the new checksum matches the checksum read from the RFID tag.

20. The cloud system of claim 19, wherein the at least one processor is further configured to receive the EPC and the checksum from an RFID reader.

21. The cloud system of claim 19, wherein the at least one processor is further configured to receive the EPC and the checksum from a mobile device that is in communication with an RFID reader.

22. A mobile device comprising:
at least one memory; and
at least one processor coupled with the at least one memory, wherein the at least one processor is configured to:
receive an electronic product code (EPC) and a checksum read from a radio-frequency identification (RFID) tag;
calculate a new checksum based on the EPC and a retailer-specific number associated with a retailer that has generated one or more RFID tags by:
loading, onto a first portion of a space allocated for a stock keeping unit (SKU) in each of the one or more RFID tags, a respective article number associated with that RFID tag; and
loading, onto a second portion of the space allocated for the SKU in each of the one or more RFID tags, a respective checksum that is calculated based on the retailer-specific number and a respective EPC associated with that RFID tag;

compare the checksum read from the RFID tag with the new checksum; and determine whether the RFID tag is generated by the retailer based on whether the new checksum matches the checksum read from the RFID tag.

23. The mobile device of claim 22, wherein the at least one processor is further configured to receive the retailer-specific number from a cloud system.

24. The mobile device of claim 22, wherein the at least one processor is further configured to receive the EPC and the checksum from an RFID reader.

* * * * *